US005995013A

United States Patent [19]

Yoshizawa et al.

[11] Patent Number: 5,995,013

[45] Date of Patent: *Nov. 30, 1999

[54] CONTROLLER USING TRANSMITTER AND RECEIVER

[75] Inventors: Takashi Yoshizawa, Sagamihara; Nobuhiro Amano, Ebina, both of Japan

[73] Assignee: Nissan Motor Co., Ltd., Yokohama, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/624,349

[22] Filed: Apr. 3, 1996

[51] Int. Cl.[6] .......... G06F 7/04

[52] U.S. Cl. .......... 340/825.31; 340/825.69; 340/825.72; 307/10.4; 307/10.3; 307/10.2; 187/287

[58] Field of Search .......... 340/825.31, 825.3, 340/425.5, 426, 825.22, 825.69, 825.72; 307/10.2, 10.3, 10.4, 10.5, 10.6; 187/287

[56] References Cited

U.S. PATENT DOCUMENTS

| | | | |
|---|---|---|---|
| 3,906,447 | 9/1975 | Crafton | 340/825.31 |
| 4,538,056 | 8/1985 | Young et al. | 235/377 |
| 4,596,985 | 6/1986 | Bongard et al. | 340/825.69 |
| 4,723,121 | 2/1988 | Van Den Boom et al. | 340/825.31 |
| 4,750,118 | 6/1988 | Heitschel et al. | 364/400 |
| 5,146,215 | 9/1992 | Drori | 340/825.32 |
| 5,412,379 | 5/1995 | Waraksa et al. | 340/825.72 |
| 5,508,691 | 4/1996 | Castleman et al. | 340/825.31 |

*Primary Examiner*—Michael Horabik
*Assistant Examiner*—Anthony A. Asongwed
*Attorney, Agent, or Firm*—Foley & Lardner

[57] ABSTRACT

When a control unit receives a second ID code within a specified time after receiving a first ID code in the ID code registration mode, and decides that the first ID code is coincident with the second ID code, the control unit stores the ID code as a newly registered ID code in a storage unit.

10 Claims, 4 Drawing Sheets

START
REGISTRABLE STATE
S11
S12
FIRST CODE IS RECEIVED ?
NO
YES
S13
TEMPORARY SAVE
TIMER START
S14
S15
SECOND CODE IS RECEIVED ?
NO
S19
SPECIFIED TIME HAS ELAPSED ?
NO
YES
S16
SAME AS TEMPORARILY SAVED CODE ?
NO
YES
S17
SPECIFIED TIME HAS ELAPSED ?
YES
NO
S18
S20
REGISTRATION OF TEMPORARILY SAVED CODE
ERASE OF TEMPORARILY SAVED CODE
END

START
REGISTRABLE STATE
S11
S12a
ID CODE IS RECEIVED ?
NO
YES
S13
TEMPORARY SAVE
TIMER START
S14
S31
REGISTRATION PERMISSION SIGNAL IS INPUTTED ?
NO
S32
SPECIFIED TIME HAS ELAPSED ?
NO
YES
YES
S18
S20
REGISTRATION OF TEMPORARILY SAVED CODE
ERASE OF TEMPORARILY SAVED CODE
END

CONTROLLER USING TRANSMITTER AND RECEIVER

BACKGROUND OF THE INVENTION

1. Field of the Invention

The present invention relates to a controller for controlling a load on the basis of results of check of an identification code set in a transmitter against an identification code set in a receiver.

2. Description of the Related Art

There has been known a controller using a transmitter and a receiver, which receives an identification code (hereinafter called an ID code) transmitted from the transmitter by the receiver, checks the ID code against an ID code previously registered, and on the basis of the checked results, controls a load (for example, refer to the publication of Japanese Laid-Open Patent No. SHO 54-163288).

Such a controller, which usually controls a load on the basis of results of check of a transmitted ID code against a registered ID code, when a user changes over to a new registration mode of ID code as required, stores a transmitted new ID code as a registered ID code, and thereafter on the basis of results of check of a transmitted ID code against the newly registered ID code, controls a load.

In a controller using a transmitter and a receiver of prior art, the registration of an ID code is performed by a procedure shown in FIG. 1. First at step 1, operating a registration mode switch of a receiver causes the receiver to become a registrable state. At subsequent step 2, when the receiver receives an ID code, the procedure proceeds to step 3, at which the received ID code is stored as a newly register ID code in a nonvolatile memory.

However, in a controller using a transmitter and a receiver of prior art, a first received ID code is registered in the ID code registration mode, so that there is a problem that for example, where the registration mode has been set in a manufacturing factory and the like for the controller, if an ID code different from an ID code to be registered is received, the different code would be registered.

SUMMARY OF THE INVENTION

An object of the present invention is to provide a controller using a transmitter and a receiver for registering an ID code while checking a user's desire for registration.

For achieving the object described above, there is provided a controller using a transmitter and a receiver, comprising a plurality of transmitting means in which respective peculiar ID codes are set, receiving means for receiving ID codes transmitted from the plurality of transmitting means, a storage means for storing previously registered ID codes of the plurality of transmitting means, and a control means for checking the ID code received by the receiving means against the registered ID code stored in the storage means, and when both are coincident with other, performing a specified control output; wherein the control means, when receiving a second ID code within a specified time after a first ID code is received in the ID code registration mode, and deciding that the first ID code is coincident with the second ID code, stores the ID code as a newly registered ID code in the storage means.

According to another aspect of the present invention, there is provided a controller using a transmitter and a receiver, comprising a plurality of transmitting means in which respective peculiar ID codes are set, receiving means for receiving ID codes transmitted from the plurality of transmitting means, a storage means for storing previously registered ID codes of the plurality of transmitting means, and a control means for checking the ID code received by the receiving means against the registered ID code stored in the storage means, and when both are coincident with other, performing a specified control output; wherein the control means, when receiving a registration permission signal within a specified time after the ID code is received in the ID code registration mode, stores the ID code as a newly registered ID code in the storage means.

In the controller using a transmitter and a receiver of the first aspect of the present invention, when a second ID code is received within a specified time after a first ID code is received in the ID code registration mode, and when the first ID code is coincident with the second ID code, the ID code is stored as a newly registered ID code. To register newly an ID code, it suffices to transmit twice the ID code from the transmitting means within a specified time, whereby the ID code can be securely registered while checking a user's will for registration, and an ID code not desired to register is not registered inadvertently.

In the controller using a transmitter and a receiver of the second aspect of the present invention, when a registration permission signal is received within a specified time after the ID code is received in the ID code registration mode, the ID code is stored as a newly registered ID code. This allows the ID code to be securely registered while checking a user's desire for registration, and an ID code not desired to register is not registered inadvertently.

The nature, principle and utility of the invention will become more apparent from the following detailed description when read in conjunction with the accompanying drawings.

DESCRIPTION OF THE PREFERRED EMBODIMENTS

There will be explained an embodiment in which a controller using a transmitter and a receiver of the present invention is applied to a keyless entry device of vehicles.

Figure 1:
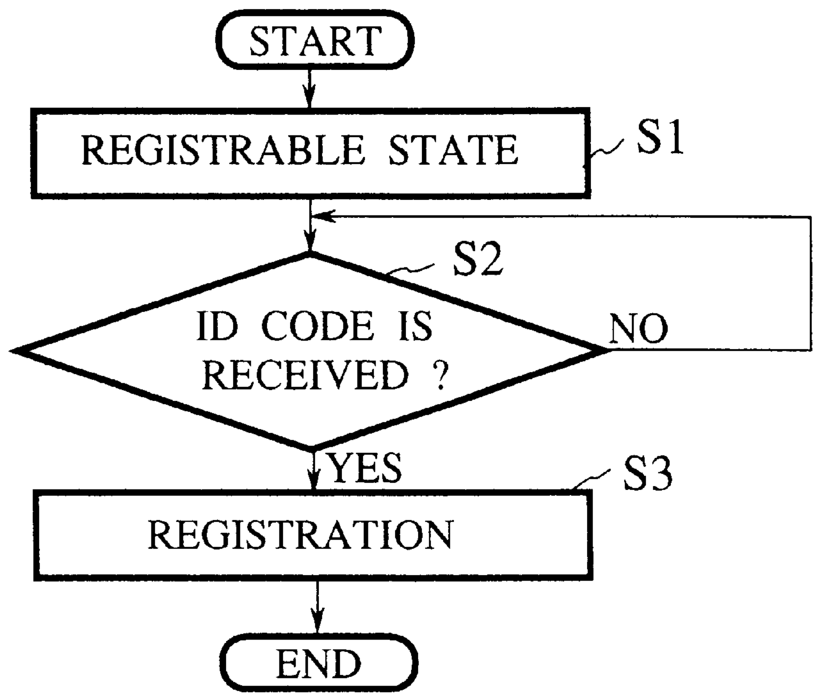
FIG. 1 is a flowchart showing an ID code registration control of prior art.
Figure 2:
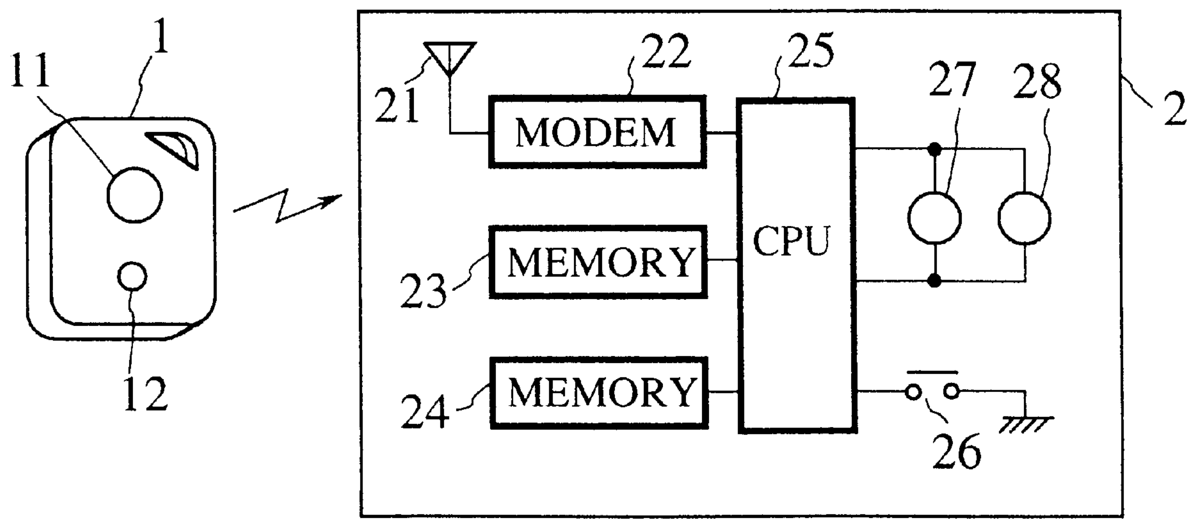
FIG. 2 is a functional block diagram showing a configuration of an embodiment according to the present invention.

FIG. 2 is a functional block diagram showing a configuration of an embodiment.

A remote control unit (hereinafter called a remote controller) 1 is provided with a door lock switch 11, a door unlock switch 12, a memory (not shown) for storing a unique ID code, a transmitter (not shown) for transmitting the ID code and a door lock signal or a door unlock signal, and a battery (not shown) as a power source thereof; and operating the door lock switch 11 or the door unlock switch 12 causes the ID code and the door lock signal or the door unlock signal to be transmitted from the transmitter.

On the other hand, a receiver 2 mounted on a vehicle is provided with a receiving antenna 21 provided, for example, at the inner side of the rear window, a modem 22 for demodulating a signal received by the antenna 21 to the ID code and the door lock signal or the door unlock signal, a nonvolatile memory 23 for storing a registered ID code, an ordinary memory 24 for temporarily storing the received ID code, a microcomputer 25 for performing both an ID code registration control and a door lock/unlock control, a registration mode switch 26, a door lock actuator 27 for the driver seat, and a door lock actuator 28 for the passenger's seat. Usually, the ID codes for a plurality of transmitters 1 are registered in one receiver 2.

The receiver 2, upon receiving a first ID code in the ID code registration mode, saves temporarily the first ID code, then, upon receiving a second ID code within a specified time, checks the second ID code against the saved first ID code, and when both are coincident with each other (i.e., identical to each other), registers the ID code.

Figure 3:
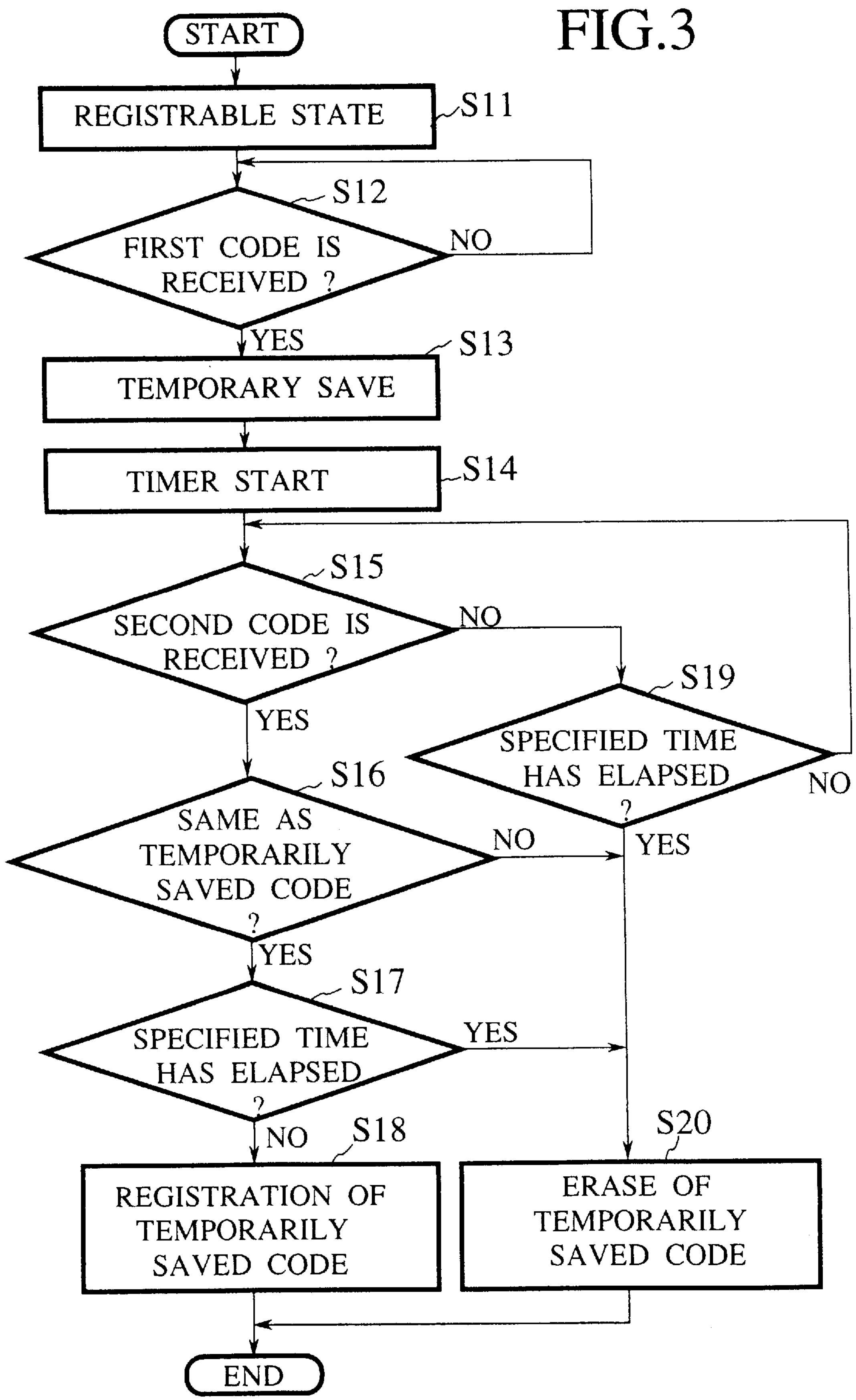
FIG. 3 is a flowchart showing an ID code registration control of a receiver.

FIG. 3 is a flowchart showing an ID code registration control of a receiver. With reference to the flowchart, the operation of the embodiment will be explained.

At step 11, when a registration mode is set by the switch 26, the microcomputer 25 sets the receiver 2 to a registrable state, and starts the ID code registration processing at step 12 or later. At step 12, whether the first ID code is received or not from the transmitter 1 is discriminated, and when the first ID code is received, the procedure proceeds to step 13, at which the received ID code is saved temporarily in the memory 24. At subsequent step 14, a timer is started for counting a time having elapsed from receiving of the first ID code. At step 15, whether the second ID code is received or not is discriminated, and when the second ID code is received, the procedure proceeds to step 16, or when not so, proceeds to step 19.

When the second ID code is received, at step 16, the second ID code is checked against the first ID code saved temporarily in the memory 24, and whether both are coincident with each other or not is discriminated. When both are coincident with each other, the procedure proceeds to step 17, at which a time having elapsed from receiving of the first ID code is within a specified time or not is discriminated, and when it is within a specified time, the procedure proceeds to step 18, at which the first ID code saved temporarily in the memory 24 is stored as a newly registered ID code in the nonvolatile memory 23. On the other hand, when the second ID code is not received, at step 19, whether a specified time has elapsed from receiving of the first ID code is discriminated, and when a specified time has elapsed, the procedure proceeds to step 20, or when not so, returns to step 15. When at steps 17 and 19, a specified time has elapsed from receiving of the first ID code, or when at step 16, it is discriminated that the first ID code is not coincident with the second ID code, at step 20, the first ID code saved temporarily in the memory 24 is erased.

When a normal remote control mode is set, the receiver 2 receives the ID code and the door lock signal or the door unlock signal, checks the received ID code against the registered ID code stored in the nonvolatile memory 23, and when both are coincident with each other, according to the lock signal or the unlock signal, drives and controls the door lock actuators 27, 28 to lock or unlock the door for driver seat and the door for the assistant driver's seat.

In this way, in the ID code registration mode, the received first ID code is temporarily saved, and when the second ID code is received within a specified time, both are checked against each other, and then when both are coincident with each other, the ID code is stored as a newly registered ID code in the nonvolatile memory, so that to register newly an ID code, it suffices to transmit twice the ID code from the transmitter 1 within a specified time, whereby the ID code can be securely registered in the receiver 2 while checking a user's desire for registration, and an ID code not desired to register is not registered inadvertently.

Figure 4:
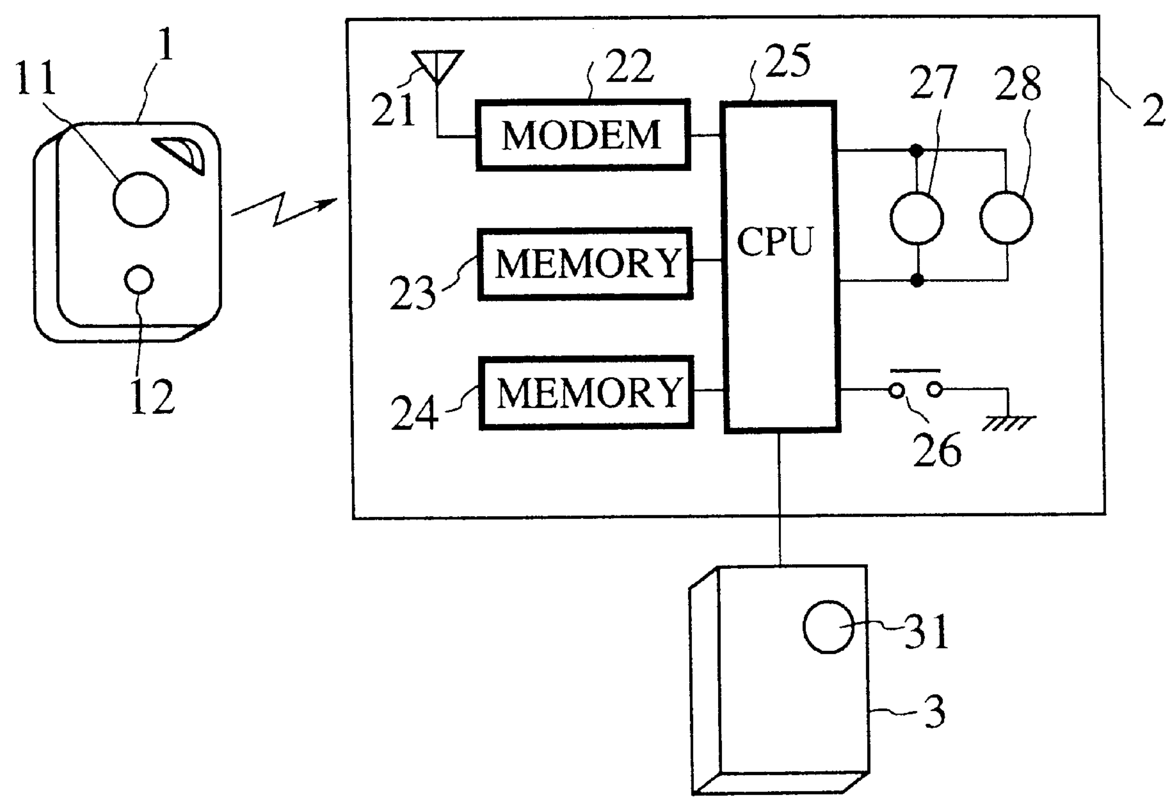
FIG. 4 is a functional block diagram showing a configuration of a modified example of the embodiment.
Figure 5:
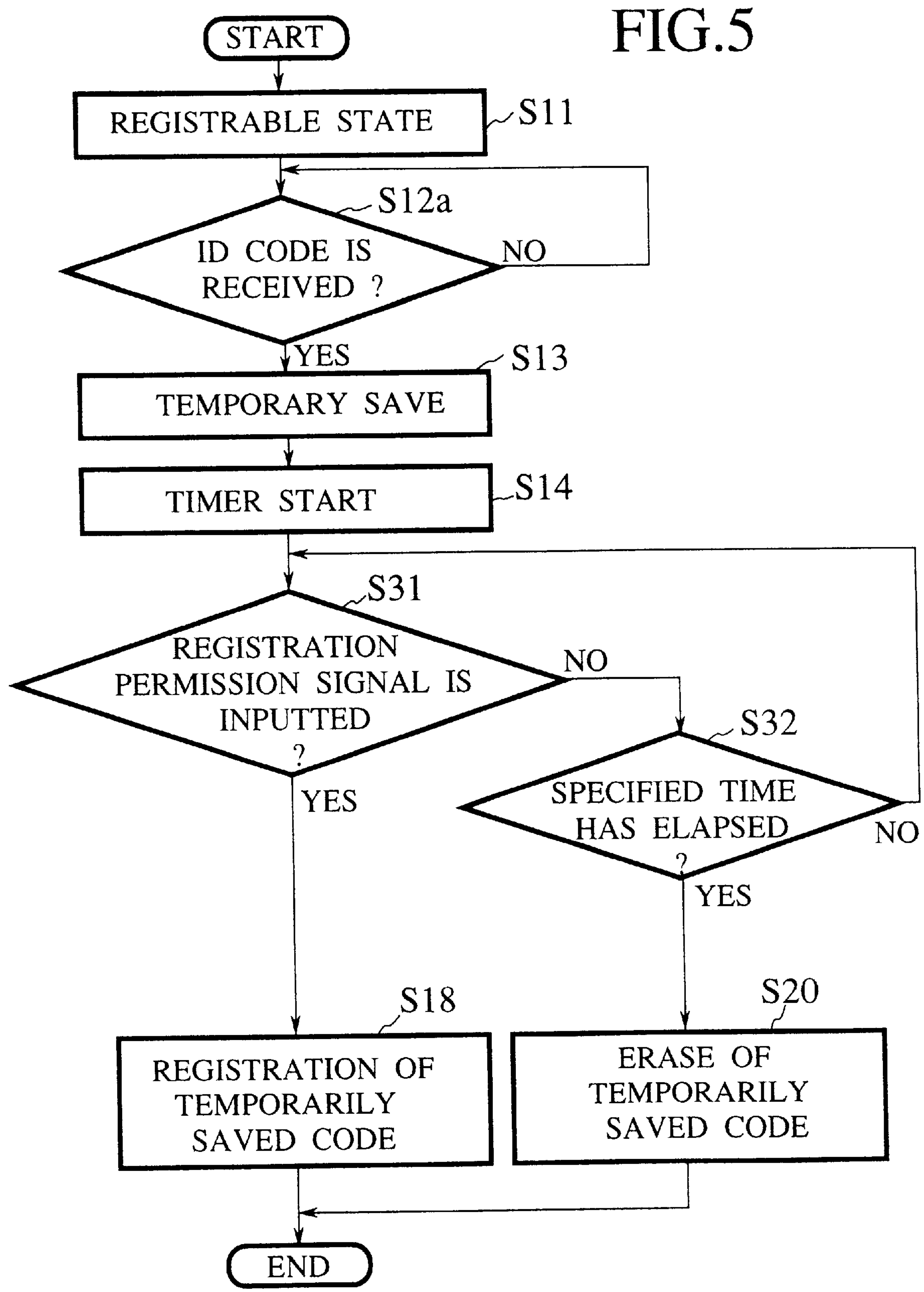
FIG. 5 is a flowchart showing an ID code registration control of a modified example of the embodiment.

FIG. 4 is a functional block diagram showing a configuration of a modified example of the embodiment; and FIG. 5 is a flowchart showing a registration control program thereof. Devices similar to and steps performing processing similar to those of the embodiment shown in FIGS. 2 and 3 are designated by the same reference codes and step numbers as those thereof, and different points will be mainly explained.

In this modified example, the receiver 2 is connected with a diagnosis device 3. The diagnosis device 3 is provided with a registration permission switch 31, and operating the registration permission switch 31 causes a registration permission signal to be outputted.

The ID code received in the registration mode is saved temporarily in the memory 24 and the timer is started, and then at step 31, whether the registration permission signal is inputted from the diagnosis device 3 or not is discriminated. When the registration permission signal is inputted, the procedure proceeds to step 18, at which the ID code saved temporarily in the memory 24 is stored as a newly registered ID code in the nonvolatile memory 23. On the other hand, when the registration permission signal is not received, at step 32, whether a specified time has elapsed from receiving of the ID code or not is discriminated, and when a specified time has elapsed, the procedure proceeds to step 20, or when not so, returns to step 31. At step 20, the ID code saved temporarily in the memory 24 is erased.

In this way, when a registration permission signal is inputted within a specified time after the ID code is received in the ID code registration mode, the ID code is registered, so that the ID code can be securely registered while checking a user's desire for registration, and an ID code not desired to register is not registered inadvertently.

Although in the above-mentioned embodiment and modified example, there has been explained an example in which a controller using a transmitter and a receiver of the present invention is applied to a keyless entry device of vehicles, the present invention can be applied to other various controllers.

In the configuration of the above-mentioned embodiment, the receiver 1 configures a transmitting means; the receiving antenna 21 and the modem 22, a receiving means; the nonvolatile memory 23, a storage means; and the microcomputer 25, a control means.

As described above, according to the first aspect of the present invention, when a second ID code is received within a specified time after a first ID code is received in the ID code registration mode, and when the first ID code is coincident with the second ID code, the ID code is stored as a newly registered ID code, so that to register newly an ID code, it suffices to transmit twice the ID code from the transmitting means within a specified time, whereby the ID code can be securely registered while checking a user's desire for registration, and an ID code not desired to register is not registered inadvertently.

Also, according to the second aspect of the present invention, when a registration permission signal is received within a specified time after the ID code is received in the ID code registration mode, the ID code is stored as a newly registered ID code, so that the ID code can be securely registered while checking a user's desire for registration, and an ID code not desired to register is not registered inadvertently.

It should be understood that many modifications adaptations of the invention will become apparent to those skilled in the art, and it is intended to encompass such obvious modifications and changes in the scope of the claims appended hereto.

What is claimed is:

1. A system using a transmitter and receiver for preventing inadvertent code registration, comprising:

a transmitting unit in which a particular ID code is set; and said receiver comprising:

a receiving unit for receiving the ID code transmitted from said transmitting unit;

a storage unit connected to said receiving unit for storing a previously registered ID code for said transmitting unit; and a control unit connected to said storage unit and said receiving unit, said control unit being operable in a control mode in which a determination is made, upon a first receipt of the ID code provided to said control unit by said receiving unit, of the first received ID code against the registered ID code stored in said storage unit, and when both are coincident with each other, a specified control output is performed, said control unit being further operable in an ID registration mode for recognizing and registering a new ID code, wherein said control unit, upon determining a second receipt of the ID code in a row within a specified time after the first receipt of the ID code, stores the ID code as the new ID code in said storage unit.

2. A system using a transmitter and a receiver according to claim 1, wherein said transmitting unit, upon operation, transmits the ID code once.

3. A system using a transmitter and receiver according to claim 1, wherein said transmitting unit transmits the ID code over-the-air to said receiving unit.

4. A system using a transmitter and a receiver according to claim 1, wherein said storage unit includes a non-volatile region and a second region separate from the non-volatile region, wherein the first ID code is stored in the second region of said storage unit, wherein the second ID code is stored in the second region of said storage unit, and wherein, when said control unit decides that the first ID is coincident with the second ID code, the first ID code is stored as the new ID code in the non-volatile region of said storage unit.

5. A system using a transmitter and a receiver according to claim 4, wherein, when said control unit decides that the first ID code is not coincident with the second ID code, the first ID code is not stored in the non-volatile region of said storage unit, and a previously-stored ID code in the non-voltage region of said storage unit is maintained as a current ID code for said receiving unit.

6. A system using a transmitter and receiver for preventing inadvertent code registration, comprising:

a transmitting unit in which a particular ID code is set; and said receiver comprising:

a receiving unit for receiving the ID code transmitted from said transmitting unit;

a storage unit connected to said receiving unit for storing a previously registered ID code for said transmitting unit; and a control unit connected to said storage unit and said receiving unit, said control unit being operable in a control mode in which a determination is made, upon receipt of the ID code provided to said control unit by said receiving unit, of the received ID code against the registered ID code stored in said storage unit, and when both are coincident with each other, a specified control output is performed, said control unit being further operable in an ID registration mode for recognizing and registering a new ID code, wherein said control unit, upon determining a receipt of a registration permission signal within a specified time after the receipt of the ID code in the ID code registration mode with no other ID codes received within the specified time, stores the ID code as the new ID code in said storage unit.

7. A system using a transmitter and a receiver according to claim 6, wherein said storage unit includes a non-volatile region and a second region separate from the non-volatile region, wherein the one ID code is initially stored in the second region of said storage unit, and wherein, when said control unit decides that the registration permission signal is received within the specified time after the receipt of the one ID code in the ID registration mode, the one ID code is stored as the new ID code in the non-volatile region of said storage unit.

8. A system using a transmitter and a receiver according to claim 7, wherein, when said control unit decides that the registration permission signal has not been received within the specified time after the receipt of the one ID code in the ID registration mode, a previously-stored ID code in the non-voltage region of said storage unit is maintained as a current ID code for said receiving unit.

9. A method of setting an ID code in a receiver for a system having a transmitter communicating with the receiver via wireless communications for preventing inadvertent code registration, the method comprising the steps of:

a) entering a registrable state for the receiver;

b) receiving a first ID code sent from the transmitter while the receiver is in the registrable state;

c) setting a timer based on the receipt of the first ID code in step b);

d) temporarily saving the first ID code in a storage unit in the receiver;

e) determining if a second ID code is received while the receiver is in the registrable state, and if so, e1) determining if the second ID code was received in step e) within a specified time after the first ID code was received in step b) and that no other ID codes were received within the specified time;

e2) if step e1) indicates that the first and second ID codes were received within the specified time and that no other ID codes were received within the specified time while the receiver is in the registrable state, determining if the first and second ID codes are coincident; and e3) if step e2) indicates that the first and second ID codes are coincident, storing the first ID code as a newly-registered ID code in the storage unit of the receiver, wherein the newly-registered ID code is stored in the storage unit of the receiver only if the coincidence in step e3) is satisfied.

10. The method according to claim 9, further comprising the step of:

e4) if step e1) indicates that the first and second ID codes were not received within the specified time while the receiver is in the registrable state, erasing the first ID code from the storage unit and maintaining a previously-registered ID code in the storage unit of the receiver.

* * * * *